(12) United States Patent
Fan et al.

(10) Patent No.: US 12,420,124 B2
(45) Date of Patent: Sep. 23, 2025

(54) THREE-DIMENSIONAL WILDFIRE MONITORING AND CONTROL METHOD AND SYSTEM FOR POWER TRANSMISSION CORRIDOR

(71) Applicant: ELECTRIC POWER RESEARCH INSTITUTE OF GUANGDONG POWER GRID CO., LTD., Guangdong (CN)

(72) Inventors: Lingmeng Fan, Guangdong (CN); Enze Zhou, Guangdong (CN); Xiaoguang Zheng, Guangdong (CN); Zhangquan Rao, Guangdong (CN); Lei Wang, Guangdong (CN); Yong Huang, Guangdong (CN); Xiang Tian, Guangdong (CN); Bing Zhao, Guangdong (CN); Ruizeng Wei, Guangdong (CN); Shuqin Liu, Guangdong (CN); Guoxiong Cheng, Guangdong (CN); Ling Zhu, Guangdong (CN); Xiaomin Sun, Guangdong (CN); Qi Liu, Guangdong (CN); Bo Gong, Guangdong (CN)

(73) Assignee: ELECTRIC POWER RESEARCH INSTITUTE OF GUANGDONG POWER GRID CO., LTD., Guangzhou (CN)

( * ) Notice: Subject to any disclaimer, the term of this patent is extended or adjusted under 35 U.S.C. 154(b) by 0 days.

(21) Appl. No.: 17/800,571

(22) PCT Filed: Dec. 22, 2021

(86) PCT No.: PCT/CN2021/140623
§ 371 (c)(1),
(2) Date: Aug. 18, 2022

(87) PCT Pub. No.: WO2023/035494
PCT Pub. Date: Mar. 16, 2023

(65) Prior Publication Data
US 2024/0216731 A1    Jul. 4, 2024

(30) Foreign Application Priority Data
Sep. 10, 2021    (CN) .......................... 202111065829.6

(51) Int. Cl.
*A62C 3/02*       (2006.01)
*G01S 17/89*      (2020.01)
(Continued)

(52) U.S. Cl.
CPC ............ *A62C 3/0271* (2013.01); *G01S 17/89* (2013.01); *G06N 7/01* (2023.01); *G06Q 10/20* (2013.01); *G06V 20/13* (2022.01); *G08B 17/005* (2013.01)

(58) Field of Classification Search
CPC ........ A62C 3/0271; G06V 20/13; G06N 7/01; G01S 17/89; G06Q 10/20; G08B 17/005
(Continued)

(56) References Cited

U.S. PATENT DOCUMENTS 10,964,201 B1 * 3/2021 Ton-That .................. G06T 7/75
2018/0098137 A1 * 4/2018 Saha ...................... G06Q 10/20
(Continued)

*Primary Examiner* — Kerri L Mcnally (57) ABSTRACT

Disclosed are a three-dimensional wildfire monitoring and control system and method for a power transmission corridor. The system includes: a wildfire-induced trip risk assessment module, for assessing, when a wildfire is detected in a power transmission corridor, a wildfire-induced trip risk in real time so as to determine whether to issue a wildfire warning; an online wildfire monitoring device layout planning module, for generating an online wildfire monitoring device layout plan for transmission lines based on the wildfire-induced trip risk, a blind spot of satellite monitoring and importance levels of the transmission lines; and a three-dimensional power transmission corridor wildfire
(Continued)

monitoring and warning module, adopting multi-source satellites and drones, and realizing three-dimensional wildfire monitoring of the power transmission corridor by monitoring through online wildfire monitoring devices provided according to the layout plan, the multi-source satellites and the drones.

12 Claims, 4 Drawing Sheets

(51) Int. Cl.
    *G06N 7/01*     (2023.01)
    *G06Q 10/20*     (2023.01)
    *G06V 20/13*     (2022.01)
    *G08B 17/00*     (2006.01)

(58) Field of Classification Search
    USPC .......................................................... 340/577
    See application file for complete search history.

(56) References Cited

U.S. PATENT DOCUMENTS

| | | | |
|---|---|---|---|
| 2018/0189898 A1* | 7/2018 | Lu | G06Q 50/06 |
| 2020/0242916 A1* | 7/2020 | Krstanovic | G08B 21/0453 |
| 2021/0034027 A1* | 2/2021 | Datta | G06N 20/00 |
| 2021/0073692 A1* | 3/2021 | Saha | G08B 21/16 |
| 2021/0116517 A1* | 4/2021 | Snook | H04L 67/535 |
| 2021/0232818 A1* | 7/2021 | Saxena | G06V 20/52 |
| 2022/0161075 A1* | 5/2022 | Snook | G08B 17/005 |

\* cited by examiner

THREE-DIMENSIONAL WILDFIRE MONITORING AND CONTROL METHOD AND SYSTEM FOR POWER TRANSMISSION CORRIDOR

TECHNICAL FIELD

The present application relates to the technical field of wildfire monitoring, in particular to a three-dimensional wildfire monitoring and control system and method for a power transmission corridor.

BACKGROUND

Transmission lines are the lifeblood of grid operation. External damage can easily cause outages or even splitting of the power grid. Overhead transmission lines mostly cross forests in mountainous areas, where wildfires are easy to occur and spread to the power transmission corridor to induce trip accidents of the power system. At present, the large-scale hot spot monitoring of wildfires is mainly carried out through satellite remote sensing (SRS) technology, and warnings are issued based on the shortest distance from the hot spot location to the transmission line. Polar orbiting satellite only transits a target area within a certain period of time. In contrast, the geostationary meteorological satellite operates synchronously with the rotation of the earth, and can realize 24-hour uninterrupted observation of the target area, which effectively expands the coverage of wildfire disaster monitoring on the transmission lines. In addition, online wildfire monitoring devices have been put into use in some transmission line sections, which form parallel monitoring channels together with the remote sensing satellites.

Compared with polar orbiting satellite, geostationary meteorological satellite has lower monitoring spatial resolution. The latitude and longitude of the fire point monitored by the geostationary satellite deviate from the actual values. Therefore, relying only on the distance between the fire point and the transmission line cannot guarantee the accuracy of wildfire warning for the power transmission corridor.

In addition, SRS monitoring has visual blind spots due to the shielding of clouds and terrain. Online wildfire monitoring devices can be set up to complement SRS monitoring. However, the layout of the online wildfire monitoring devices lacks systematic planning schemes and guidelines. It mainly relies on people's subjective assessment, and has problems such as redundancy and low efficiency.

SUMMARY

The present application provides a three-dimensional wildfire monitoring and control system and method for a power transmission corridor to solve the problems of low warning accuracy and unreasonable distribution of monitoring devices in the prior art.

In order to solve the above technical problems, the present application provides a three-dimensional wildfire monitoring and control system for a power transmission corridor. The system includes: a wildfire-induced trip risk assessment module, for assessing, when a wildfire is detected in a power transmission corridor, a wildfire-induced trip risk in real time so as to determine whether to issue a wildfire warning; an online wildfire monitoring device layout planning module, for generating an online wildfire monitoring device layout plan for transmission lines based on the wildfire-induced trip risk, a blind spot of satellite monitoring and importance levels of the transmission lines; and a three-dimensional power transmission corridor wildfire monitoring and warning module, adopting multi-source satellites and drones, and realizing three-dimensional wildfire monitoring of the power transmission corridor by monitoring through online wildfire monitoring devices provided according to the layout plan, the multi-source satellites and the drones, where the online wildfire monitoring devices are provided in the blind spot of multi-source satellite remote sensing, and the drones inspect the power transmission corridor during a preset period.

Optionally, the wildfire-induced trip risk assessment module may be further used for: building a wildfire-conditioned trip risk assessment model for the transmission lines based on a flame combustion model, assessing the wildfire-induced trip risk in real time based on the risk assessment model, and outputting an assessment result to guide operation and maintenance personnel to inspect the transmission lines.

Optionally, the wildfire-induced trip risk assessment module may be further used for: assessing the wildfire-induced trip risk R according to a conductor's discharge voltage $U_g$ to a ground and phase-to-phase discharge voltage $U_p$ in case of a wildfire, $R=\max(R_g, R_p)$, $$R_g = \frac{\sqrt{2/3} \times U}{U_g} \text{ and } R_p = \frac{\sqrt{2} \times U}{U_p},$$

where U is a current operating voltage of the transmission lines; $R_g$ is a wildfire risk related to the discharge voltage $U_g$ to the ground; $R_p$ is a wildfire risk related to the phase-to-phase discharge voltage $U_p$; and classifying the importance levels of the transmission lines into low-risk, medium-risk, medium-high risk and high-risk according to the wildfire-induced trip risk R.

Optionally, the online wildfire monitoring device layout planning module may be further used for: assessing, based on a Bayesian theoretical model, a wildfire occurrence risk distribution in a target area according to wildfire impact factors, including a meteorological factor, a surface factor and a human factor; and scanning the power transmission corridor through drones equipped with a laser radar, deriving an impact factor for assessing the wildfire-induced trip risk through a meteorological station distribution in the target area, statically assessing a wildfire-conditioned trip risk distribution of the power transmission corridor, and superposing a wildfire risk to obtain a wildfire-induced trip risk distribution map.

Optionally, the online wildfire monitoring device layout planning module may be further used for: scanning the power transmission corridor through drones equipped with a laser radar to acquire information of all lines and the earth's surface in the power transmission corridor in the target area, where the information of the lines and the earth's surface includes longitude and latitude of a tower, a conductor-to-ground distance, a phase-to-phase distance, a distance to a ground conductor, a height of a tree, a slope, an aspect and meteorological data; forming a wildfire-conditioned trip risk distribution trend map of the transmission lines according to the assessment result generated by the wildfire-induced trip risk assessment module; introducing the Bayesian theoretical model, solving a wildfire occurrence probability under a combined effect of various wildfire impact factors based on naive Bayes, weighted Bayes and Bayesian networks, and selecting an optimal Bayesian wildfire occurrence probability model according to a calculation efficiency to solve a wildfire occurrence risk P; classifying wildfire occurrence risk levels into low-risk, medium-risk, medium-high risk and high-risk according to the wildfire occurrence risk P; calculating, based on the optimal Bayesian wildfire occurrence probability model, a wildfire occurrence probability with a preset resolution in the target area, and processing in levels to form a wildfire occurrence risk distribution map; and averaging and rounding up risks based on the wildfire-conditioned trip risk distribution trend map of the transmission lines and the wildfire occurrence risk distribution map, to obtain a final wildfire-induced trip risk distribution map of the transmission lines.

Optionally, the three-dimensional power transmission corridor wildfire monitoring and warning module may be further used for: acquiring remote sensing data of the multi-source satellites, where the multi-source satellites include at least one polar orbiting satellite and one geostationary satellite; acquiring image and video data of the online monitoring devices in a high-risk area of the transmission lines, as well as image and video data of the drones inspecting during the preset period, and building a wildfire monitoring database of the power transmission corridor; and realizing three-dimensional and parallel wildfire monitoring and warning channels that integrate the remote sensing satellites, the online monitoring devices and the drones according to data in the wildfire monitoring database of the power transmission corridor.

In order to solve the above technical problems, the present application provides a three-dimensional wildfire monitoring and control method for a power transmission corridor. The method includes: assessing, when a wildfire is detected in a power transmission corridor, a wildfire-induced trip risk in real time so as to determine whether to issue a wildfire warning; generating an online wildfire monitoring device layout plan for transmission lines based on the wildfire-induced trip risk, a blind spot of satellite monitoring and importance levels of the transmission lines; and realizing three-dimensional wildfire monitoring of the power transmission corridor by monitoring through online wildfire monitoring devices provided according to the layout plan, multi-source satellites and drones, where the online wildfire monitoring devices are provided in the blind spot of multi-source satellite remote sensing, and the drones inspect the power transmission corridor during a preset period.

Optionally, before generating an online wildfire monitoring device layout plan for transmission lines based on the wildfire-induced trip risk, a blind spot of satellite monitoring and importance levels of the transmission lines, the method may include: assessing the wildfire-induced trip risk R according to a conductor's discharge voltage $U_g$ to a ground and phase-to-phase discharge voltage $U_p$ in case of a wildfire, $R=\max(R_g, R_p)$, $$R_g = \frac{\sqrt{2/3} \times U}{U_g} \text{ and } R_p = \frac{\sqrt{2} \times U}{U_p},$$

where U is a current operating voltage of the transmission lines; $R_g$ is a wildfire risk related to the discharge voltage $U_g$ to the ground; $R_p$ is a wildfire risk related to the phase-to-phase discharge voltage $U_p$; and classifying the importance levels of the transmission lines into low-risk, medium-risk, medium-high risk and high-risk according to the wildfire-induced trip risk R.

In order to solve the above technical problems, the present application provides an electronic device. The electronic device includes a memory and a processor, where the memory is connected to the processor; the memory stores a computer program; and the computer program is executed by the processor to implement the above three-dimensional wildfire monitoring and control method for a power transmission corridor.

In order to solve the above technical problems, the present application provides a computer-readable storage medium. The computer-readable storage medium stores a computer program, where the computer program is executed by a processor to implement the above three-dimensional wildfire monitoring and control method for a power transmission corridor.

According to the three-dimensional wildfire monitoring and control system and method provided in the present application, when a wildfire is detected in a power transmission corridor, a wildfire-induced trip risk is assessed in real time so as to determine whether to issue a wildfire warning. In addition, an online wildfire monitoring device layout plan is generated for transmission lines based on the wildfire-induced trip risk, a blind spot of satellite monitoring and importance levels of the transmission lines. In this way, the present application solves the problems of redundancy and low efficiency of monitoring devices. The present application introduces multi-source satellites to realize the three-dimensional parallel wildfire monitoring and warning channels of the remote sensing satellites, the online monitoring devices and the drones, thereby improving the accuracy of wildfire warning for the power transmission corridor.

BRIEF DESCRIPTION OF DRAWINGS

To describe the technical solutions in the implementations of the present application more clearly, the drawings required to describe the implementations of the present application are briefly described below. Apparently, the drawings described below are only some implementations of the present application. Those of ordinary skill in the art may further obtain other drawings based on these drawings without creative efforts.

DETAILED DESCRIPTION

In order to help those skilled in the art better understand the technical solutions in the present application, the three-dimensional wildfire monitoring and control system and method for a power transmission corridor provided by the present application are described in further detail below with reference to the drawings and specific implementations.

Figure 1:
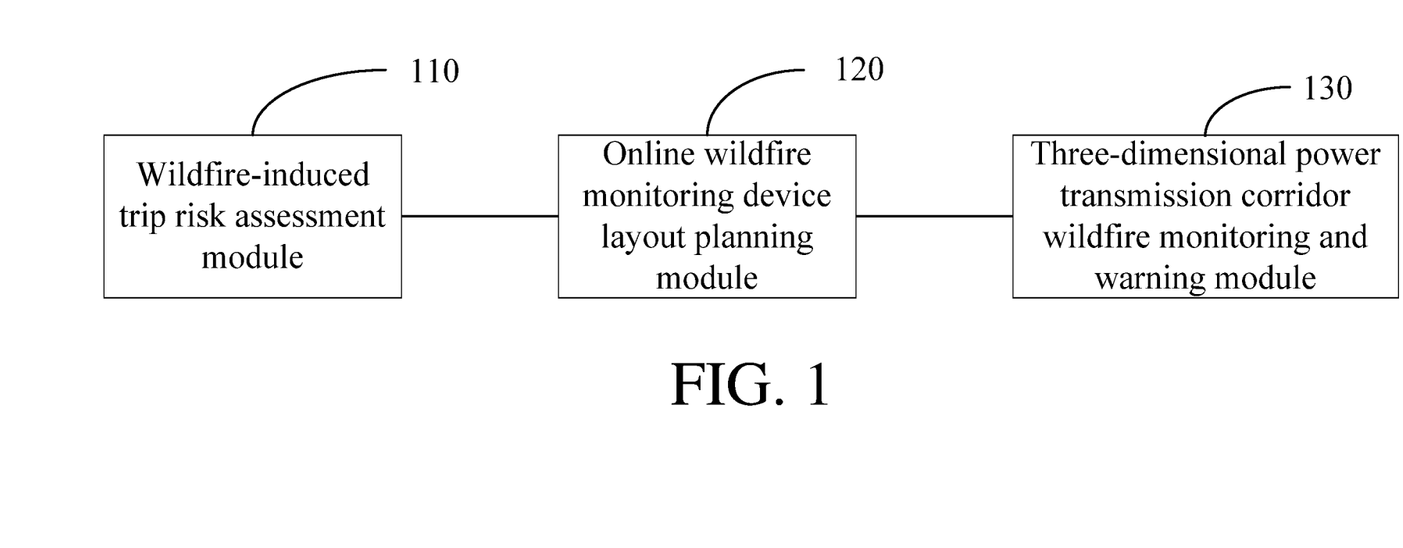
FIG. 1 is a view illustrating a structure of a three-dimensional wildfire monitoring and control system for a power transmission corridor according to an embodiment of the present application.

The present application provides a three-dimensional wildfire monitoring and control system for a power transmission corridor. FIG. 1 is a view illustrating a structure of a three-dimensional wildfire monitoring and control system for a power transmission corridor according to an embodiment of the present application. Referring to FIG. 1, the three-dimensional wildfire monitoring and control system includes: a wildfire-induced trip risk assessment module 110, an online wildfire monitoring device layout planning module 120 and a three-dimensional power transmission corridor wildfire monitoring and warning module 130.

The wildfire-induced trip risk assessment module 110 is used for: assessing, when a wildfire is detected in a power transmission corridor, a wildfire-induced trip risk in real time so as to determine whether to issue a wildfire warning.

Optionally, the wildfire-induced trip risk assessment module is further used for: building a wildfire-conditioned trip risk assessment model for the transmission lines based on a flame combustion model. First, the wildfire-induced trip risk assessment model can be used to assess the wildfire-induced trip risk in real time and output an assessment result to guide operation and maintenance personnel to inspect the transmission lines. Second, the risk assessment model can be used to statically assess a wildfire-conditioned trip risk distribution of the power transmission corridor in the target area, so as to guide the layout of online monitoring devices.

The online wildfire monitoring device layout planning module 120 is used for: generating an online wildfire monitoring device layout plan for transmission lines based on the wildfire-induced trip risk, a blind spot of satellite monitoring and importance levels of the transmission lines.

Optionally, the online wildfire monitoring device layout planning module is further used for: assessing, based on a Bayesian theoretical model, a wildfire occurrence risk distribution in a target area according to wildfire impact factors, including a meteorological factor, a surface factor and a human factor; and scanning the power transmission corridor through drones equipped with a laser radar, deriving an impact factor for assessing the wildfire-induced trip risk through a meteorological station distribution in the target area, statically assessing a wildfire-conditioned trip risk distribution of the power transmission corridor, and superposing a wildfire risk to obtain a wildfire-induced trip risk distribution map. Finally, the online wildfire monitoring device layout planning module generates an online wildfire monitoring device layout plan for the transmission lines by comprehensively considering the wildfire-induced trip risk, the blind spot of satellite monitoring and the importance levels of the transmission lines.

The three-dimensional power transmission corridor wildfire monitoring and warning module 130 adopts multi-source satellites and drones, and is used for realizing three-dimensional wildfire monitoring of the power transmission corridor by monitoring through online wildfire monitoring devices provided according to the layout plan, the multi-source satellites and the drones, where the online wildfire monitoring devices are provided in the blind spot of multi-source satellite remote sensing, and the drones inspect the power transmission corridor during a preset period.

The present application introduces multi-source satellites to improve the temporal and spatial resolution of remote sensing monitoring, and provides online wildfire monitoring devices according to the layout plan to solve the blind spot problem in satellite remote sensing monitoring. In addition, the present application uses drones to conduct special inspections on the power transmission corridor during a preset period (usually during a period of high wildfire incidence) to jointly realize the three-dimensional wildfire monitoring of the power transmission corridor. When a fire point is monitored, the present application determines whether to issue a warning based on the shortest distance between the fire point and the transmission line and the wildfire-induced trip risk assessed in real time.

According to the three-dimensional wildfire monitoring and control system provided in this embodiment, when a wildfire is detected in a power transmission corridor, a wildfire-induced trip risk is assessed in real time so as to determine whether to issue a wildfire warning. In addition, an online wildfire monitoring device layout plan is generated for transmission lines based on the wildfire-induced trip risk, a blind spot of satellite monitoring and importance levels of the transmission lines. In this way, the present application solves the problems of redundancy and low efficiency of monitoring devices. The present application introduces multi-source satellites to realize the three-dimensional parallel wildfire monitoring and warning channels of the remote sensing satellites, the online monitoring devices and the drones, thereby improving the accuracy of wildfire warning for the power transmission corridor.

Optionally, the wildfire-induced trip risk assessment module is further used for: assessing the wildfire-induced trip risk R according to a conductor's discharge voltage $U_g$ to a ground and phase-to-phase discharge voltage $U_p$ in case of a wildfire, $R=\max(R_g,R_p)$, $$R_g = \frac{\sqrt{2/3} \times U}{U_g} \text{ and } R_p = \frac{\sqrt{2} \times U}{U_p},$$

where U is a current operating voltage of the transmission lines; $R_g$ is a wildfire risk related to the discharge voltage $U_g$ to the ground; $R_p$ is a wildfire risk related to the phase-to-phase discharge voltage $U_p$; and classifying the importance levels of the transmission lines into low-risk, medium-risk, medium-high risk and high-risk according to the wildfire-induced trip risk R.

Figure 2:
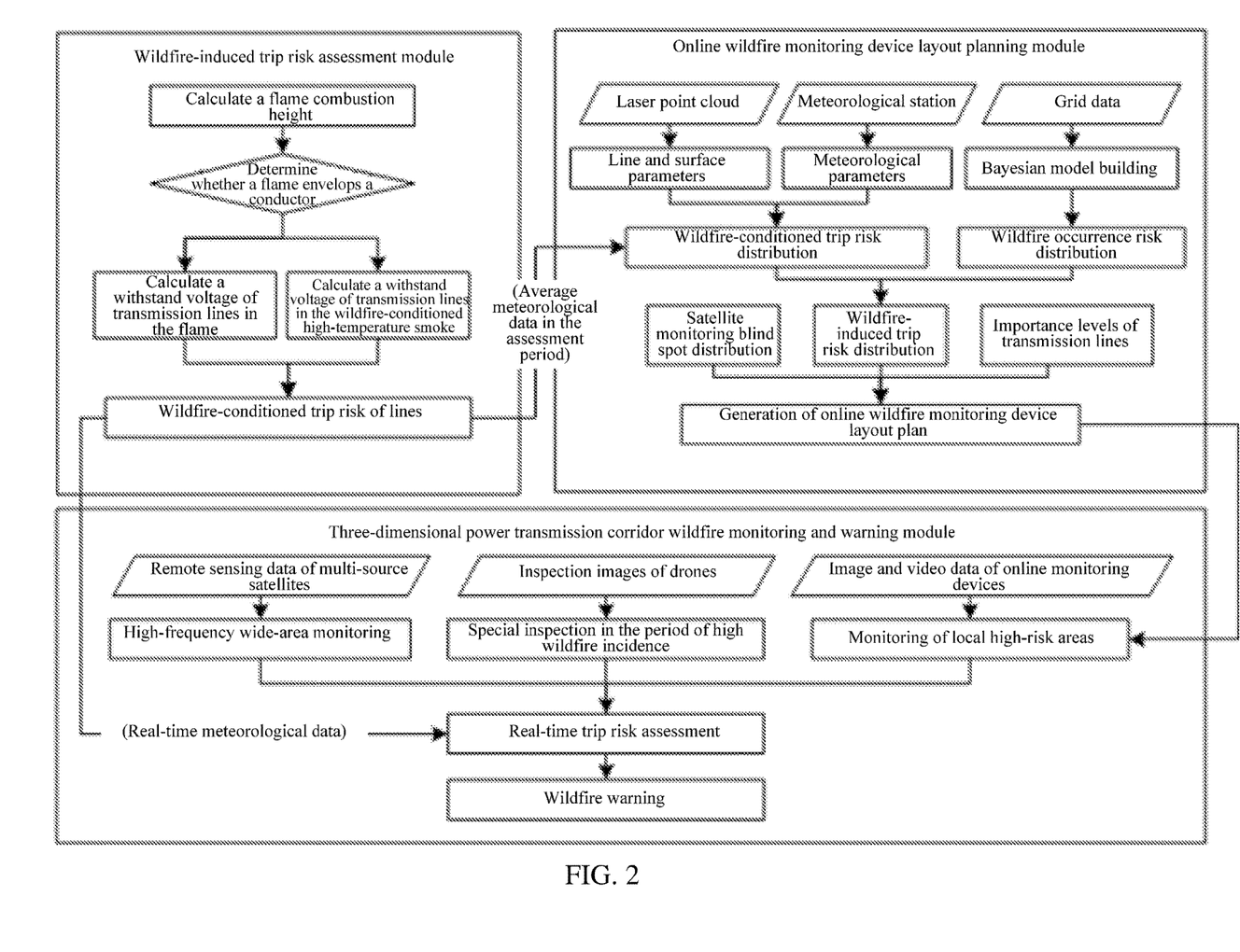
FIG. 2 is a view illustrating a structure of the three-dimensional wildfire monitoring and control system for a power transmission corridor according to another embodiment of the present application.

Referring to FIG. 2, FIG. 2 is a view illustrating a structure of the three-dimensional wildfire monitoring and control system for a power transmission corridor according to another embodiment of the present application. The three-dimensional wildfire monitoring and control system for a power transmission corridor mainly includes three modules, a wildfire-induced trip risk assessment module, an online wildfire monitoring device layout planning module and a three-dimensional power transmission corridor wildfire monitoring and warning module.

A) Wildfire-Induced Trip Risk Assessment Module

The module can be used to implement the following steps:

Step 1: Assess a wildfire-conditioned trip risk of transmission lines.

(1) Calculate a Flame Combustion Height $H_f$ $$H_f = \sqrt{I/250} \tag{1}$$

where, I is a fireline intensity, which is calculated as follows:

$$I = qWR \tag{2}$$

$$R = K_c K_\varphi K_v R_0 \tag{3}$$

-continued $$K_v = e^{0.178v} \quad (4)$$

$$K_\varphi = e^{3.533 \tan \varphi^{1.2}} \quad (5)$$

$$R_0 = 0.03T + 0.05F + 0.01H + 0.7 \quad (6)$$

where, q is a heating value of a combustible; W is a combustible load on an underlying surface; R is a fire spread speed; and $K_c$ is a combustible type correction coefficient, which is determined by the type of the combustible on the underlying surface. Since the focus of consideration is crown fire in case of a forest fire, $K_c=1$. $K_\varphi$ and $K_v$ represent a slope correction coefficient and a wind speed correction coefficient respectively; and $R_0$ is an initial fire spread speed. v is a wind speed during the period; φ is a slope; T is a temperature; F is a wind scale; and H is a relative humidity.

(2) Compare a Spatial Position Relationship Between a Flame and the Transmission Lines.

1) If the flame envelops a conductor, calculate the conductor's discharge voltage $U_g$ to the ground and phase-to-phase discharge voltage $U_p$ as follows:

$$U_g = (H_l - H_t) \times E_f = d_{l-t} \times E_f \quad (7)$$

$$U_p = d_p \times E_f \quad (8)$$

where, $H_l$ is a height of the conductor to the ground after sagging is considered, and $H_t$ is a maximum height of a treetop under the power transmission corridor; $d_{l-t}$ is a length of an air gap between the conductor and the treetop; $d_p$ is a phase-to-phase distance of the conductor; and $E_f$ is an average breakdown field strength of the flame, which is 35 kV/m according to a long-air-gap breakdown test of a wood fire.

2) If the flame does not envelop the conductor, calculate the conductor's discharge voltage $U_g$ to the ground and phase-to-phase discharge voltage $U_p$ as follows:

$$U_g = H_f \times E_f + (H_l - H_t - H_f) \times E_s \quad (9)$$

$$U_p = d_p \times E_s \quad (10)$$

where, $H_f$ is a maximum flame combustion height calculated by a flame combustion model; and $E_s$ is an average breakdown field strength of smoke in case of a wildfire, which is calculated as follows:

$$E_s = K_p K_\sigma K_h E_a \quad (11)$$

$$K_\sigma = \sigma^m \quad (12)$$

$$\sigma = \frac{(273 + T_a)}{(273 + T_a + \Delta T)} \quad (13)$$

$$\Delta T = \frac{39I^{\frac{2}{3}}}{H_s} \quad (14)$$

$$K_h = k^w \quad (15)$$

$$k = 1 + 0.012(h/\sigma - 11) \quad (16)$$

$$E_a = \left(\frac{1850 + 59d_s}{1 + 3.89/d_s} + 92\right)/d_s = \frac{59d_s^2 + 1942d_s + 357.88}{d_s^2 + 3.89d_s} \quad (17)$$

where, $K_p$, $K_\sigma$ and $K_h$ are a particle correction coefficient, an air density correction coefficient and an air humidity correction coefficient respectively, $K_p=0.4$; $E_a$ is a breakdown field strength of a pure air gap under standard atmospheric conditions (20° C., 11 g/m³, and 101.3 kPa); σ is a relative density of air in the smoke; m is an air density correction index, m=1; $T_a$ is an ambient temperature; ΔT is an air temperature increase when the flame is burning; I is a fireline intensity; $H_s$ is a height between a midpoint of a smoke gap and underlying vegetation, and when average phase-to-phase and conductor-to-ground breakdown field strengths of the smoke are calculated, $H_s=d_{l-t}$ and $H_s=H_f+(d_{l-t}-H_f)/2$; w is a humidity correction index, w=1; k is a humidity correction base, which is related to an absolute humidity h and an air density σ in the smoke; and $d_s$ is a gap distance.

(3) Assess a Wildfire-Conditioned Trip Risk of the Transmission Lines.

A wildfire-induced trip risk R is assessed according to the conductor's discharge voltage $U_g$ to the ground and phase-to-phase discharge voltage $U_p$ in case of a wildfire. Trip risk levels are classified in Table 1 below.

$$R = \max(R_g, R_p) \quad (18)$$

$$R_g = \frac{\sqrt{2/3} \times U}{U_g} \quad (19)$$

$$R_p = \frac{\sqrt{2} \times U}{U_p} \quad (20)$$

where, U is an operating voltage of the transmission lines.

TABLE 1

| Trip risk levels | |
| --- | --- |
| R | Risk levels |
| R ≤ 0.5 | Low |
| 0.5 < R ≤ 0.8 | Medium |
| 0.8 < R ≤ 1 | Medium-high |
| 1 < R | High |

B) Online Wildfire Monitoring Device Layout Planning Module

The module can be used to implement the following steps:

Step 1: Scan the power transmission corridor through drones equipped with a laser radar to acquire information of lines and the earth's surface in all transmission line channels in the target area, where the information of the lines and the earth's surface includes longitude and latitude of a tower, a conductor-to-ground distance, a phase-to-phase distance, a distance to a ground conductor, a height of a tree, a slope, an aspect and meteorological data. The average values of all meteorological data during an assessment period are taken according to the timeliness requirements for assessing the trip risk distribution (usually on a yearly basis).

Step 2: Calculate, by the wildfire-induced trip risk assessment module based on a wildfire-conditioned trip risk assessment model for the transmission lines, a flame height between every two towers, and assess a trip risk according to the flame enveloping the conductor of the transmission line or not; and visualize based on geographic information software to form a wildfire-conditioned trip risk distribution trend map of the transmission lines.

Step 3: Acquire impact factor data of a wildfire in a target area with a resolution of 1 km×1 km. The impact factors include a human factor, a surface factor and a meteorological factor, as shown in Table 2.

TABLE 2

Wildfire impact factors

| Human factor | Surface factor | Meteorological factor |
|---|---|---|
| Fire point density | Altitude | Average annual temperature |
| Distance from residential area | Slope | Annual precipitation |
| Distance from road | Aspect | — |
| Gross domestic product (GDP) | Vegetation type | — |
| Population density | Land use type | — |
| — | Vegetation index (normalized difference vegetation index, NDVI) | — |

Step 4: Introduce the Bayesian theoretical model, solve a wildfire occurrence probability under a combined effect of various wildfire impact factors based on naive Bayes, weighted Bayes and Bayesian networks, and select an optimal Bayesian wildfire occurrence probability model according to a calculation efficiency to solve a wildfire occurrence risk P. The wildfire occurrence risk is classified in Table 3 below.

TABLE 3

Wildfire occurrence risk levels

| P | Risk levels |
|---|---|
| P ≤ 0.25 | Low |
| 0.25 < R ≤ 0.5 | Medium |
| 0.5 < R ≤ 0.75 | Medium-high |
| 0.75 < R | High |

Step 5: Calculate, based on an optimal Bayesian wildfire occurrence probability model, a wildfire occurrence probability with a resolution of 1 km×1 km in the target area, and process in levels; and visualize based on geographical information software to form a wildfire occurrence risk distribution map.

Step 6: Average and round up risks based on the wildfire-conditioned trip risk distribution trend map of the transmission lines and the wildfire occurrence risk distribution map obtained in Steps 2 and 5 respectively, to obtain a final wildfire-induced trip risk distribution map of the transmission lines. The classification principles are shown in the following table:

TABLE 4

Principles for the classification of wildfire-induced trip risks of transmission lines

| Wildfire occurrence risks | Wildfire-conditioned trip risks of transmission lines | | | |
|---|---|---|---|---|
| | Low | Medium | Medium-high | High |
| Low | Low | Medium | Medium | Medium-high |
| Medium | Medium | Medium | Medium-high | Medium-high |
| Medium-high | Medium | Medium-high | Medium-high | High |
| High | Medium-high | Medium-high | High | High |

Step 7: Construct a wildfire risk index for the transmission lines to guide the layout of the online wildfire monitoring devices.

A wildfire monitoring blind spot distribution of China Southern Power Grid (CSPG) is recorded as $x_1$, and its importance is comprehensively scored. If the transmission lines are in a blind spot of monitoring, 4 points are scored, otherwise 1 point is scored. The comprehensive importance score of the voltage level of transmission lines of the CSPG is recorded as $x_2$. Lines with 500 kV and above are scored 4 points, 220 kV lines are scored 2 points, and 110 kV lines are scored 1 point. For transmission lines extremely important for the stability of the power grid or key crossing lines, 1 point is added plus the original voltage level score. The wildfire-induced trip risk level of the power transmission corridor of the CSPG is recorded as $x_3$. High-risk lines are scored 4 points, medium-high-risk lines are scored 3 points, medium-risk lines are worth 2 points, and low-risk lines are scored 1 point. The scoring of each risk indicator is shown in Table 1. The wildfire risk index Y of the power transmission corridor is as follows:

$$Y = \alpha x_1 + \beta x_2 + \gamma x_3 \qquad (21)$$

where, $\alpha$, $\beta$ and $\gamma$ are weight values determined by an analytic hierarchy process (AHP) after analysis by experts in the field of wildfire disaster prevention and mitigation. $\alpha=0.4$, $\beta=0.2$, $\gamma=0.4$.

TABLE 5

Scoring criteria for wildfire risk index of transmission lines

| Wildfire risk indicators | 1 point | 2 points | 3 points | 4 points |
|---|---|---|---|---|
| Satellite monitoring blind spot $x_1$ | No | — | — | Yes |
| Line importance level $x_2$ | 35 kV | 110 kV | 220 kV | 500 kV and above |
| Wildfire-induced trip risk level $x_3$ of power transmission corridor | Low | Medium | Medium-high | High |

C) Three-Dimensional Power Transmission Corridor Wildfire Monitoring and Warning Module The module can be used to implement the following steps:

Step 1: Acquire remote sensing data from multi-source satellites, including 7 polar orbiting satellites and 2 geostationary satellites, where the monitoring characteristics of the satellites are shown in Table 2; acquire image and video data of the online monitoring devices in a high-risk area of the transmission lines, as well as image and video data of the drones inspecting during a period of high wildfire incidence; and build a wildfire monitoring database of the power transmission corridor. A three-dimensional monitoring system includes the following aspects:

1) Based on multi-source satellite remote sensing, 24-hour uninterrupted high-frequency and wide-area fire spot monitoring in the target area is realized.

2) The geostationary satellites are synchronized with the rotation of the earth. In addition, due to the field of view and elevation angle, mountains and terrain, as well as clouds under extreme weather, inevitably lead to certain blind spots for monitoring. Therefore, the three indicators of satellite monitoring blind spot, wildfire-induced trip risk level and line importance level are comprehensively considered to construct a wildfire risk index for the transmission lines. Online monitoring devices are provided in local and key transmission corridor sections with a high wildfire risk to complement satellite remote sensing.

3) During a period of high wildfire incidence, multiple wildfires often occur simultaneously or one after another. In order to improve the line inspection efficiency of operation and maintenance units, based on the wildfire-induced risk distribution map of the transmission lines, drones are used to conduct special inspections on high-trip risk lines from time to time so as to strictly prevent the negative impact of wildfires on the power system.

Step 2: Realize three-dimensional and parallel wildfire monitoring and warning channels that integrate the remote sensing satellites, the online monitoring devices and the drones according to the sources of the monitoring data.

(1) Multi-Source Satellite Coordination Strategy

1) The data access time of the two geostationary satellites GK-2A and Himiwari-8 (time resolution 10 min/time) is staggered, and the monitoring time resolution is increased to 5 min/time. When the two satellites both detect a wildfire, based on daily operating experience, the satellite data with a smaller deviation in the spatial position of the monitored fire point is used to assess whether a warning is needed.

2) Polar orbiting meteorological satellites are limited by their transit time and cannot achieve 24-hour monitoring. However, they are close to the ground, and thus have high spatial sensitivity for fire spot monitoring. For a fire point occurring within the transit time of the polar orbiting satellite, priority will be given to selecting polar orbiting satellite data to assess whether a warning is needed.

3) When a fire point is determined, a shortest distance from the fire point to the transmission lines is calculated, and data is acquired in real time according to the wildfire-conditioned trip risk assessment model to assess a trip risk.

(a) When the distance is greater than 3 km, if the risk of tripping is low, no warning will be issued temporarily; and if the risk of tripping is high, the direction of wildfire spread is continuously observed.

(b) When the distance is 1.5-3 km, if the risk of tripping is low, no warning will be issued temporarily; if the risk of tripping is high, a warning will be issued.

(c) When the distance is less than 1.5 km, a warning will be issued directly.

TABLE 6

Monitoring characteristics of various types of satellites

| SN | Type of satellite | Name of satellite | Country | Transit frequency | Transit time in China | Infrared spatial resolution |
|---|---|---|---|---|---|---|
| 1 | Geostationary satellite | GK-2A | South Korea | Geostationary, full-time monitoring | Transit every 10 minutes | 2 km |
| 2 | | Himawari-8 | Japan | Geostationary, full-time monitoring | Transit every 10 minutes | 2 km |
| 3 | Polar orbiting satellite | FY3B | China | Monitoring and afternoon satellites, transit 4 times a day | Around 2:30 pm | 1.1 km |
| 4 | | FY3C | China | | Around 11:00 am | 1.1 km |
| 5 | | FY3D | China | | Around 11:00 am | 1.1 km |
| 6 | | NOAA18 | America | Double satellites, transit 4 times a day | Around 6:00 pm/ 8:00 am | 1 km |
| 7 | | NOAA19 | America | Double satellites, transit 4 times a day | Around 4:00 pm/ 6:00 am | 1 km |
| 8 | | TERRA | America | Transit one time a day | Around 11:30 am | 1 km |
| 9 | | AQUA | America | Transit one time a day | Around 2:30 pm | 1 km |
| 110 | | NPP | America | Transit twice a day | Around 2:00 pm | 0.8 km |
| 111 | | MetOP | Europe | Transit one time a day | Around 2:30 pm | 1 km |

(2) Monitoring Strategy of Online Monitoring Devices

Based on the image and video information returned by the online monitoring devices, computer and manual methods are combined to determine whether a wildfire occurs. When a wildfire occurs in the power transmission corridor, a warning will be issued in time. According to the size of the fire and the condition of the underlying surface, drones are used to efficiently inspect the spread of the wildfire in the power transmission corridor, and operation and maintenance measures are formulated.

(3) Special Inspections of Drones

Special inspection tasks for the transmission lines in the period of high wildfire incidence are planned in advance. Based on the wildfire-induced trip risk distribution map, drones are used to perform a global scan of power transmission corridor sections with medium-high risks, and control measures are deployed in advance.

In the embodiment of the present application, the three-dimensional wildfire monitoring and control system for a power transmission corridor includes the wildfire-induced trip risk assessment module 110, the online wildfire monitoring device layout planning module 120 and the three-dimensional power transmission corridor wildfire monitoring and warning module 130. These modules may respectively include one or more processors, controllers or chips that have a communication interface and can implement a communication protocol, and may also include a memory chip and a related interface, system transmission bus, etc., if necessary. The processors, controllers or chips execute program-related codes to implement corresponding functions. In an alternative solution, the wildfire-induced trip risk assessment module 110, the online wildfire monitoring device layout planning module 120 and the three-dimensional power transmission corridor wildfire monitoring and warning module 130 share an integrated chip or share devices such as a processor, a controller and a memory. The shared processor, controller or chip executes program-related codes to implement corresponding functions. The online wildfire monitoring device includes sensors and cameras, and has one or more processors, controllers or chips, and may also include memory and related interfaces, system transmission buses, and the like, if necessary.

In summary, this embodiment discloses a wildfire-conditioned trip risk assessment method for transmission lines based on a flame combustion model, a wildfire occurrence risk assessment method based on a Bayesian theoretical model, and a wildfire-induced trip risk assessment method that combines the above two methods. This embodiment comprehensively considers the wildfire-induced trip risk of the transmission lines, the blind spot of satellite monitoring and the importance levels of the lines to construct a wildfire risk index of the transmission lines to guide the layout of the online monitoring devices. This embodiment further provides a wildfire monitoring and warning system for transmission lines, which integrates remote sensing satellites, online monitoring devices and drones.

Figure 3:
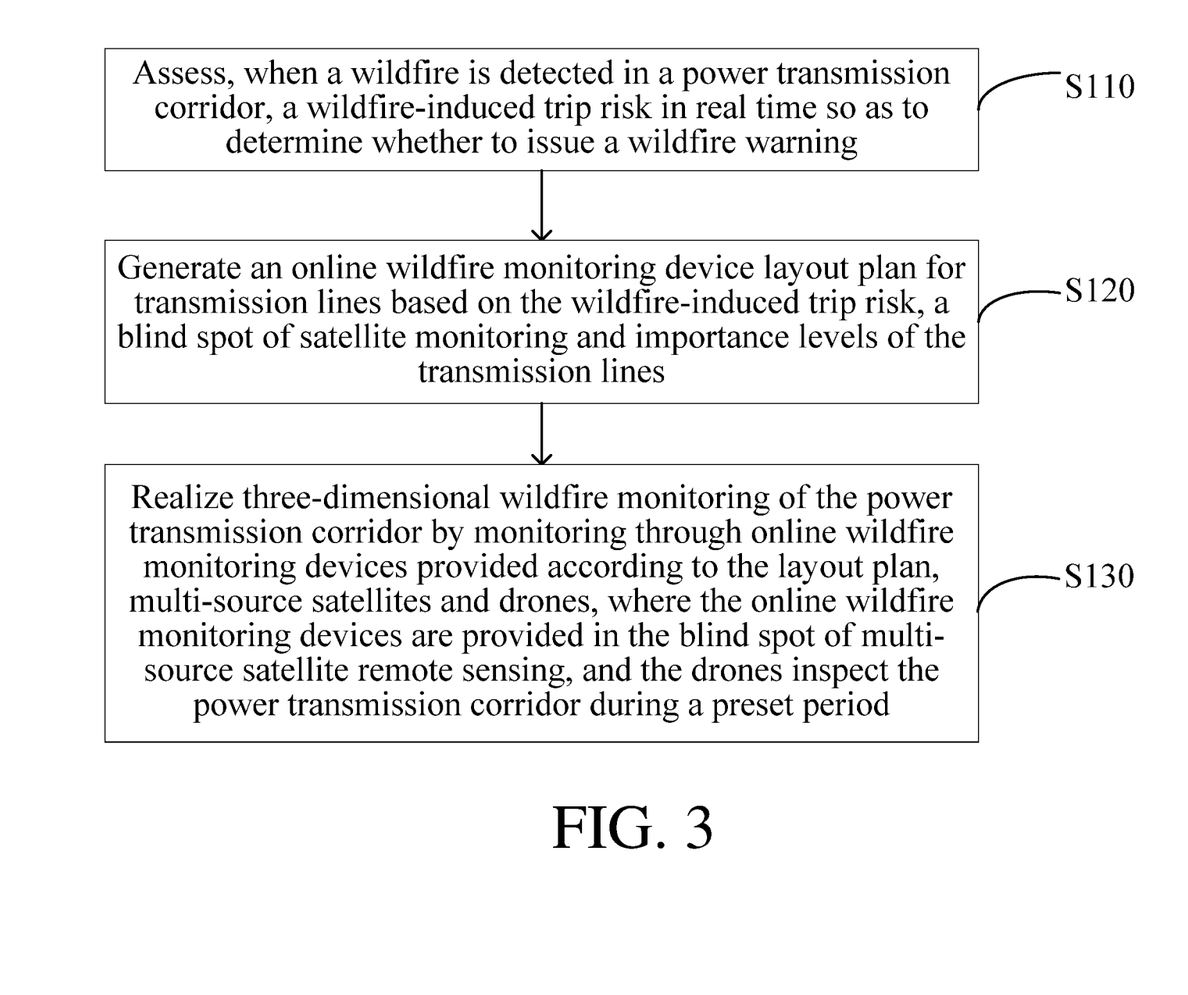
FIG. 3 is a flowchart of a three-dimensional wildfire monitoring and control method for a power transmission corridor according to an embodiment of the present application.

Based on the above three-dimensional wildfire monitoring and control system for a power transmission corridor, the present application further provides a three-dimensional wildfire monitoring and control method for a power transmission corridor, as shown in FIG. 3. FIG. 3 is a flowchart of the three-dimensional wildfire monitoring and control method for a power transmission corridor according to an embodiment of the present application. In this embodiment, the three-dimensional wildfire monitoring and control method for a power transmission corridor may include the following steps:

S110: Assess, when a wildfire is detected in a power transmission corridor, a wildfire-induced trip risk in real time so as to determine whether to issue a wildfire warning.

S120: Generate an online wildfire monitoring device layout plan for transmission lines based on the wildfire-induced trip risk, a blind spot of satellite monitoring and importance levels of the transmission lines.

S130: Realize three-dimensional wildfire monitoring of the power transmission corridor by monitoring through online wildfire monitoring devices provided according to the layout plan, multi-source satellites and drones, where the online wildfire monitoring devices are provided in the blind spot of multi-source satellite remote sensing, and the drones inspect the power transmission corridor during a preset period.

Optionally, before generating an online wildfire monitoring device layout plan for transmission lines based on the wildfire-induced trip risk, a blind spot of satellite monitoring and importance levels of the transmission lines, the method includes: assess the wildfire-induced trip risk R according to a conductor's discharge voltage $U_g$ to a ground and phase-to-phase discharge voltage $U_p$ in case of a wildfire, R=max ($R_g,R_p$), $$R_g = \frac{\sqrt{2/3} \times U}{U_g} \text{ and } R_p = \frac{\sqrt{2} \times U}{U_p},$$

where U is a current operating voltage of the transmission lines; $R_g$ is a wildfire risk related to the discharge voltage $U_g$ to the ground; $R_p$ is a wildfire risk related to the phase-to-phase discharge voltage $U_p$; and classify the importance levels of the transmission lines into low-risk, medium-risk, medium-high risk and high-risk according to the wildfire-induced trip risk R.

Figure 4:
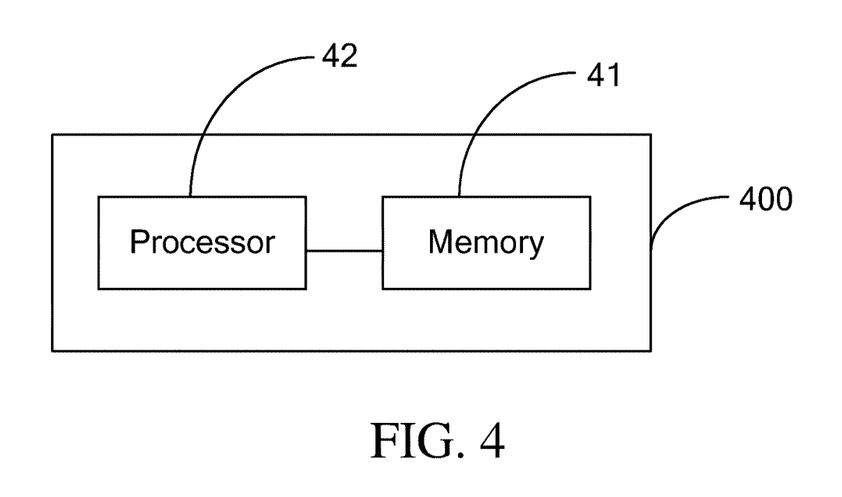
FIG. 4 is a view illustrating a structure of an electronic device according to an embodiment of the present application.

Based on the above three-dimensional wildfire monitoring and control method for a power transmission corridor, the present application further provides an electronic device, as shown in FIG. 4. FIG. 4 is a view illustrating a structure of the electronic device according to an embodiment of the present application. The electronic device 400 may include a memory 41 and a processor 42, where the memory 41 is connected to the processor 42; the memory 41 stores a computer program; and the computer program is executed by the processor 42 to implement the method described in any one of the above embodiments. The steps and principles are described in detail in the above method, and will not be repeated here.

In this embodiment, the processor 42 may also be a central processing unit (CPU). The processor 42 may be an integrated circuit (IC) capable of signal processing. The processor 42 may also be a general-purpose processor, a digital signal processor (DSP), an application-specific integrated circuit (ASIC), a field programmable gate array (FPGA) or other programmable logic device, a discrete gate or a transistor logic device, or a discrete hardware component. The general-purpose processor may be a microprocessor, or the processor may be any conventional processor, etc.

Figure 5:
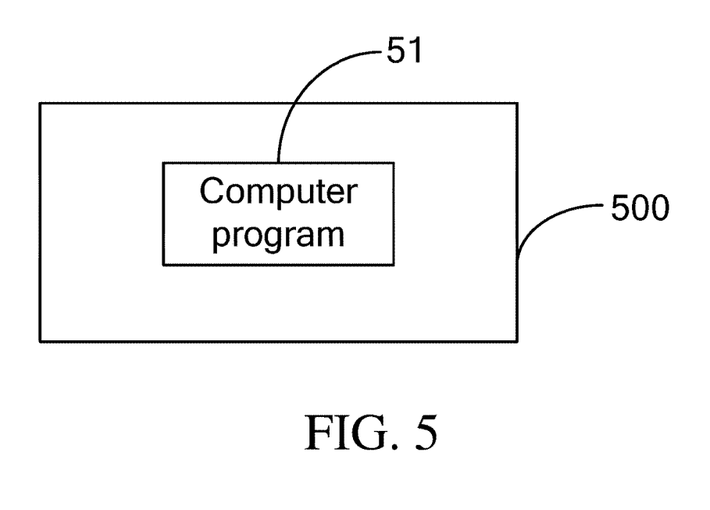
FIG. 5 is a view illustrating a structure of a computer-readable storage medium according to an embodiment of the present application.

Based on the above three-dimensional wildfire monitoring and control method for a power transmission corridor, the present application further provides a computer-readable storage medium. Referring to FIG. 5, FIG. 5 is a view illustrating a structure of the computer-readable storage medium according to an embodiment of the present application. The computer-readable storage medium 500 stores a computer program 51, where the computer program 51 is executed by a processor to implement the method described in any one of the above embodiments. The steps and principles are described in detail in the above method, and will not be repeated here.

Further, the computer-readable storage medium 500 may also be any medium that can store a program code, such as a universal serial bus (USB) flash disk, a removable hard disk, a read-only memory (ROM), a random access memory (RAM), a magnetic disk or an optical disk.

It is understandable that the specific embodiments described herein are merely intended to explain the present application, rather than to limit the present application. For ease of description, only a part rather than all of the structures related to the present application are shown in the drawings. The step numbers used herein are only for the convenience of description, and are not used as a limitation on the order of execution of the steps. All other embodiments obtained by those of ordinary skill in the art based on the embodiments of the present application without creative efforts should fall within the protection scope of the present application.

The terms such as "first" and "second" in the present application are used to distinguish different objects, rather than to describe a specific sequence. In addition, the terms "include", "have" and any variations thereof are intended to cover non-exclusive inclusions. For example, a process, method, system, product or device that includes a series of steps or units is not limited to the listed steps or units. On the contrary, optionally, it also includes steps or units that are not listed, or optionally also includes other steps or units inherent to the process, method, product or device.

The "embodiment" mentioned herein means that a specific feature, structure or characteristic described in combination with the embodiment may be included in at least one embodiment of the present application. The term appearing in different parts of the specification does not necessarily refer to the same embodiment or an independent or alternative embodiment exclusive of other embodiments. It may be explicitly or implicitly appreciated by those skilled in the art that the embodiment described herein may be combined with other embodiments.

The above described are merely implementations of the present application, which do not constitute a limitation on the scope of the present patent application. Any equivalent structure or equivalent process change made based on the description and drawings of the present application, or direct or indirect application thereof in other related technical fields, should still fall in the protection scope of the patent of the present application.

The invention claimed is:

1. A three-dimensional wildfire monitoring and control system for a power transmission corridor, comprising:
    a wildfire-induced trip risk assessment module, for assessing, when a wildfire is detected in a power transmission corridor, a wildfire-induced trip risk in real time so as to determine whether to issue a wildfire warning;
    an online wildfire monitoring device layout planning module, for generating an online wildfire monitoring device layout plan for transmission lines based on the wildfire-induced trip risk, a blind spot of satellite monitoring and importance levels of the transmission lines; and
    a three-dimensional power transmission corridor wildfire monitoring and warning module, adopting multi-source satellites and drones, and realizing three-dimensional wildfire monitoring of the power transmission corridor by monitoring through online wildfire monitoring devices provided according to the layout plan, the multi-source satellites and the drones, wherein the online wildfire monitoring devices are provided in the blind spot of multi-source satellite remote sensing, and the drones inspect the power transmission corridor during a preset period.

2. The three-dimensional wildfire monitoring and control system for a power transmission corridor according to claim 1, wherein the wildfire-induced trip risk assessment module is further used for:
    building a wildfire-conditioned trip risk assessment model for the transmission lines based on a flame combustion model, assessing the wildfire-induced trip risk in real time based on the risk assessment model, and outputting an assessment result to guide operation and maintenance personnel to inspect the transmission lines.

3. The three-dimensional wildfire monitoring and control system for a power transmission corridor according to claim 2, wherein the wildfire-induced trip risk assessment module is further used for:
    assessing the wildfire-induced trip risk R according to a conductor's discharge voltage $U_g$ to a ground and phase-to-phase discharge voltage $U_p$ in case of a wildfire, $R=\max(R_g, R_p)$, $$R_g = \frac{\sqrt{2/3} \times U}{U_g} \text{ and } R_p = \frac{\sqrt{2} \times U}{U_p},$$

wherein U is a current operating voltage of the transmission lines; $R_g$ is a wildfire risk related to the discharge voltage $U_g$ to the ground; $R_p$ is a wildfire risk related to the phase-to-phase discharge voltage $U_p$; and
    classifying the importance levels of the transmission lines into low-risk, medium-risk, medium-high risk and high-risk according to the wildfire-induced trip risk R.

4. The three-dimensional wildfire monitoring and control system for a power transmission corridor according to claim 1, wherein the online wildfire monitoring device layout planning module is further used for:
    assessing, based on a Bayesian theoretical model, a wildfire occurrence risk distribution in a target area according to wildfire impact factors, comprising a meteorological factor, a surface factor and a human factor; and scanning the power transmission corridor through drones equipped with a laser radar, deriving an impact factor for assessing the wildfire-induced trip risk through a meteorological station distribution in the target area, statically assessing a wildfire-conditioned trip risk distribution of the power transmission corridor, and superposing a wildfire risk to obtain a wildfire-induced trip risk distribution map.

5. The three-dimensional wildfire monitoring and control system for a power transmission corridor according to claim 4, wherein the online wildfire monitoring device layout planning module is further used for:
    scanning the power transmission corridor through drones equipped with a laser radar to acquire information of all lines and the earth's surface in the power transmission corridor in the target area, wherein the information of the lines and the earth's surface comprises longitude and latitude of a tower, a conductor-to-ground distance, a phase-to-phase distance, a distance to a ground conductor, a height of a tree, a slope, an aspect and meteorological data;

forming a wildfire-conditioned trip risk distribution trend map of the transmission lines according to the assessment result generated by the wildfire-induced trip risk assessment module;

introducing the Bayesian theoretical model, solving a wildfire occurrence probability under a combined effect of various wildfire impact factors based on naive Bayes, weighted Bayes and Bayesian networks, and selecting an optimal Bayesian wildfire occurrence probability model according to a calculation efficiency to solve a wildfire occurrence risk P;

classifying wildfire occurrence risk levels into low-risk, medium-risk, medium-high risk and high-risk according to the wildfire occurrence risk P;

calculating, based on the optimal Bayesian wildfire occurrence probability model, a wildfire occurrence probability with a preset resolution in the target area, and processing in levels to form a wildfire occurrence risk distribution map; and averaging and rounding up risks based on the wildfire-conditioned trip risk distribution trend map of the transmission lines and the wildfire occurrence risk distribution map, to obtain a final wildfire-induced trip risk distribution map of the transmission lines.

6. The three-dimensional wildfire monitoring and control system for a power transmission corridor according to claim 5, wherein the three-dimensional power transmission corridor wildfire monitoring and warning module is further used for:

acquiring remote sensing data of the multi-source satellites, wherein the multi-source satellites comprise at least one polar orbiting satellite and one geostationary satellite; acquiring image and video data of the online monitoring devices in a high-risk area of the transmission lines, as well as image and video data of the drones inspecting during the preset period, and building a wildfire monitoring database of the power transmission corridor; and realizing three-dimensional and parallel wildfire monitoring and warning channels that integrate the remote sensing satellites, the online monitoring devices and the drones according to data in the wildfire monitoring database of the power transmission corridor.

7. A three-dimensional wildfire monitoring and control method for a power transmission corridor, comprising:

assessing, when a wildfire is detected in a power transmission corridor, a wildfire-induced trip risk in real time so as to determine whether to issue a wildfire warning;

generating an online wildfire monitoring device layout plan for transmission lines based on the wildfire-induced trip risk, a blind spot of satellite monitoring and importance levels of the transmission lines; and realizing three-dimensional wildfire monitoring of the power transmission corridor by monitoring through online wildfire monitoring devices provided according to the layout plan, multi-source satellites and drones, wherein the online wildfire monitoring devices are provided in the blind spot of multi-source satellite remote sensing, and the drones inspect the power transmission corridor during a preset period.

8. The three-dimensional wildfire monitoring and control method for a power transmission corridor according to claim 7, wherein before generating an online wildfire monitoring device layout plan for transmission lines based on the wildfire-induced trip risk, a blind spot of satellite monitoring and importance levels of the transmission lines, the method comprises:

assessing the wildfire-induced trip risk R according to a conductor's discharge voltage $U_g$ to a ground and phase-to-phase discharge voltage $U_p$ in case of a wildfire, $R=\max(R_g,R_p)$, $$R_g = \frac{\sqrt{2/3} \times U}{U_g} \text{ and } R_p = \frac{\sqrt{2} \times U}{U_p},$$

wherein U is a current operating voltage of the transmission lines; $R_g$ is a wildfire risk related to the discharge voltage $U_g$ to the ground; $R_p$ is a wildfire risk related to the phase-to-phase discharge voltage $U_p$; and classifying the importance levels of the transmission lines into low-risk, medium-risk, medium-high risk and high-risk according to the wildfire-induced trip risk R.

9. An electronic device, comprising a memory and a processor, wherein the memory is connected to the processor; the memory stores a computer program; and the computer program is executed by the processor to implement the three-dimensional wildfire monitoring and control method for a power transmission corridor according to claim 7.

10. A non-transitory computer-readable storage medium, wherein the computer-readable storage medium stores a computer program; and the computer program is executed to implement the three-dimensional wildfire monitoring and control method for a power transmission corridor according to claim 7.

11. An electronic device, comprising a memory and a processor, wherein the memory is connected to the processor; the memory stores a computer program; and the computer program is executed by the processor to implement the three-dimensional wildfire monitoring and control method for a power transmission corridor according to claim 8.

12. A non-transitory computer-readable storage medium, wherein the computer-readable storage medium stores a computer program; and the computer program is executed to implement the three-dimensional wildfire monitoring and control method for a power transmission corridor according to claim 8.

* * * * *